Patented Nov. 18, 1941

2,262,953

UNITED STATES PATENT OFFICE 2,262,953

MANUFACTURE OF HEAT INSULATION MATERIAL AND COMPOSITION THEREFOR AND RESULTING PRODUCT

Roger A. MacArthur and Harold W. Greider, Wyoming, Ohio, assignors to The Philip Carey Manufacturing Company, a corporation of Ohio No Drawing. Application July 6, 1939, Serial No. 283,066

18 Claims. (Cl. 18—47.5)

This invention relates to the manufacture of heat insulation material and composition therefor and the resulting product. It relates especially to improved methods of manufacturing heat insulations containing magnesium carbonate and calcium carbonate and is particularly applicable to the manufacture of high temperature heat insulation from the mineral dolomite.

Dolomite has been extensively used in the past and still is the most important source of magnesium carbonate for use in the manufacture of the heat insulation material known as 85% magnesia. The method most commonly followed in making 85% magnesia insulation is the Pattinson process. Dolomite rock is substantially an equi-molecular mixture of magnesium carbonate and calcium carbonate with minor proportions of ingredients termed impurities such as iron oxide and silica. In the practice of the Pattinson process, the dolomite rock is first calcined in a suitable kiln to form a mixture of calcium and magnesium oxides. These oxides are then slaked with water to form calcium and magnesium hydroxides which are relatively insoluble in water and may be made into a dilute aqueous suspension. The next step in the process is to convert the magnesium hydroxide component of the mixture of magnesium and calcium hydroxides into magnesium bicarbonate. Owing to the limited solubility of magnesium bicarbonate under usual conditions, the suspension of the calcium and magnesium hydroxides is made quite dilute so that all of the magnesium hydroxide can be converted into magnesium bicarbonate solution. In slaking dolomite lime, it is common practice to charge the hydrators with about 300 pounds of calcined dolomite and to make up the resulting suspension of calcium and magnesium hydroxides to a volume of about 1500 to about 2000 gallons. The conversion of the magnesium hydroxide in the dilute suspension to magnesium bicarbonate is accomplished by treating the suspension with carbon dioxide gas, whereupon the calcium hydroxide precipitates as extremely finely-divided insoluble calcium carbonate and the magnesium hydroxide is converted to magnesium bicarbonate in solution. The suspension is then filtered and the calcium carbonate is rejected, the calcium carbonate (commonly known as "whiting") being largely a waste product that hitherto has had only limited use. The filtered magnesium bicarbonate solution is then boiled at a temperature somewhat above 200° F. to precipitate basic magnesium carbonate in a finely-divided form. Excess water is removed from the basic magnesium carbonate by decantation or filtration, or both, and the basic magnesium carbonate is made into an aqueous slurry containing as solids about 85% of basic magnesium carbonate and about 15% of asbestos fiber. The slurry is then pumped into filter molds of desired shape in which the slurry is molded under a pressure of about 15 to 40 pounds per square inch with expulsion of excess water from the molds. After articles have been molded in this way, they are removed from the molds and dried. The articles upon being dried are then trimmed and machined to desired dimensions and are ready for use as insulating slabs, pipe coverings or the like.

In the practice of the Pattinson process, the calcium content of the dolomite becomes a waste material and, in spite of the fact that it is rejected, it must go through a considerable part of the process used in making the insulation. This is uneconomical, both from the point of view of discarding more than half of the dolomite that is used and from the point of view of carrying a discarded material through a substantial part of the process.

It has been proposed heretofore to utilize at least some of the calcium carbonate that is formed in the Pattinson process by incorporating it in a heat insulation material as described in Patent No. 2,042,096 issued to one of the applicants herein, namely, Harold W. Greider. As described in this patent, calcium carbonate is not separated entirely from magnesium bicarbonate solution, but is mixed with the basic magnesium carbonate either during or after boiling the magnesium bicarbonate solution to convert the magnesium bicarbonate in solution to basic magnesium carbonate. In order to afford adequate structural strength and other desired characteristics to the product, the basic magnesium carbonate and calcium carbonate are combined with other materials such as bentonite clay, Amphibole fiber, hydrated lime, diatomaceous earth, and the like. While the heat insulation described in Patent No. 2,042,096 is very satisfactory and has been used commercially to a very large extent, such insulation can be materially improved according to the present invention. One improvement that is afforded by the present invention is that, for a given strength, the insulation can be made of lower density. This is important both because of the fact that the heat insulating efficiency is improved at lower density and because of the fact that the cost of the insulation as marketed, since it is sold by volume rather than by weight, is reduced when the density is lowered, other conditions remaining the same. Moreover, heat insulation material made according to Patent No. 2,042,096 shrinks considerably during drying, and this necessitates an undesirably high trimming loss in machining to proper ultimate dimensions the molded article which becomes shrunken and warped during drying. The trimming scrap has, of course, much less commercial value than the molded and trimmed article.

It is a purpose of this invention to afford an improved method of manufacturing heat insulation material comprising calcium carbonate and basic magnesium carbonate. It is a feature of the present invention that a solution of magnesium bicarbonate is first prepared and that this solution is treated with lime comprising calcium so as to form a mixture of normal magnesium carbonate and calcium carbonate. The mixture of normal magnesium carbonate and calcium carbonate can then be made into a slurry which may, in addition, contain fibrous material such as asbestos fiber. Upon molding the slurry and heating the molded article while moist to above about 160° F., the normal magnesium carbonate is converted into basic magnesium carbonate in the presence of calcium carbonate. The result of this process is the formation of a heat insulation material that is firmly bonded together by the conversion in situ of the normal magnesium carbonate into basic magnesium carbonate and, due to the presence of the calcium carbonate, the insulation has higher heat resistance than ordinary 85% magnesia, for example. Moreover, the insulation does not shrink appreciably during molding and excess trimming losses are avoided.

If the lime that is added to the magnesium bicarbonate solution in the practice of this invention consists entirely of calcium oxide or hydroxide, the lime will react with magnesium bicarbonate to form in substantially equal proportions normal magnesium carbonate and calcium carbonate. It is a feature of preferred practice of this invention, however, to add to magnesium bicarbonate solution dolomitic lime, namely, lime which contains not only calcium oxide or hydroxide but also magnesium oxide or hydroxide. When dolomitic lime is used, one can salvage some of the calcium carbonate that is normally lost in the Pattinson process. Moreover, heat insulation made from the product that is thus produced is superior in significant respects to heat insulation that is prepared when magnesium bicarbonate solution is treated solely with calcium lime. The term lime is used herein as embracing both calcium lime and magnesium lime and mixtures thereof. In dolomitic lime, the calcium and magnesium limes are in approximately equal proportions, namely, the proportions in which the calcium and magnesium carbonates occur in dolomites.

In the manufacture of a heat insulation material using materials such as normal magnesium carbonate and calcium carbonate, it is important that these materials be in a physical form which permits the commercial manufacture of heat insulation materials in a uniformly satisfactory way. We have found, and it is an important feature of this invention, that by treating magnesium bicarbonate solution with calcium containing lime, preferably dolomitic lime or other mixture of calcium lime and magnesium lime, the normal magnesium carbonate and the calcium carbonate are formed in a state that is highly desirable for use in the manufacture of heat insulation materials. The reaction of the magnesium bicarbonate solution with the lime is one that can be readily controlled so as to produce normal magnesium carbonate and calcium carbonate of suitable physical character and especially adapted for making light and strong heat insulation materials. The employment of a process which thus permits commercial operations to be carried on with uniformly satisfactory results is of great practical value.

In order to afford a specific illustration of the practice of this invention, reference will be made to the production of heat insulation material using magnesium bicarbonate such as that which is produced at one stage in the Pattinson process hereinabove described. About 1000 gallons of the magnesium bicarbonate solution at a temperature of about 120° F. are introduced into a 12,000 gallon cylindrical tank, the tank being equipped with, for example, a circulating pump adapted to impart a substantial degree of mixing and agitation through the contents of the tank. In order to determine the concentration of the magnesium bicarbonate solution in the tank, it may be titrated with a standard acid. For purposes of this example, it may be assumed that the magnesium bicarbonate solution contains about .25 pound of magnesium bicarbonate per gallon of solution, this concentration corresponding to about 250 pounds of the magnesium bicarbonate dissolved in the water in the tank. 85 pounds of hydrated dolomitic lime is then added to the contents of the tank. The dolomitic lime is prepared by calcining the dolomitic rock to form calcined dolomitic lime, and this lime is preferably hydrated with a small amount of water, for example, about 10 gallons prior to its introduction into the tank. The resulting paste of hydrated lime is preferably diluted so that it becomes a thin slurry suitable for pumping into the tank, or alternatively, the paste of hydrated lime may be washed into the tank in a stream of water. Before the lime suspension is introduced into the tank, it is preferably settled or water-floated to remove heavy impurities and unhydrated fragments which would react slowly in the tank. During the introduction of the lime into the tank, agitation is continued until the filtrate from a sample taken from the suspension of normal carbonate of magnesium admixed with calcium carbonate is substantially neutral, indicating that substantially all of the magnesium bicarbonate has reacted with the calcium hydroxide and magnesium hydroxide of the dolomitic lime to form calcium and magnesium carbonates. The reaction may be carried out batchwise or in a continuous operation. The suspension at this stage is a milky liquid. Mineral fiber such as asbestos fiber is introduced into the suspension either before or after the addition of the lime or after the suspension of calcium and magnesium carbonates has been formed and concentrated by settling or filtering, or both. The resulting slurry can then be molded. If there is an excess of water, the slurry can be molded in filter molds, preferably at a pressure of about 2 to 30 lbs. per square inch. If the slurry is relatively heavy paste, it can be molded in molds without expulsion of excess water. The molding in such case may be with or without pressure.

The molds may be of desired shape to produce articles such as flat slabs, preformed hemicylindrical pipe coverings or the like. After the articles have been molded, the articles are heated above about 160° F. and preferably at a temperature of about 180° F., or somewhat higher under such conditions that a minimum amount of water is evaporated from the articles prior to the articles becoming hardened or set due to conversion of the normal magnesium carbonate in the molded mass to basic magnesium carbonate as a result of the heating. A hardening temperature of about 300° F. is about as high as may be practically used, inasmuch as higher temperatures cause excessively rapid expulsion of vapor. At a temperature of about 300° F., the articles will harden in a few minutes. At a temperature of about 180° F., the articles will harden sufficiently in a few hours. Part of the hardening step may be accomplished while the articles are being dried and after they have been removed from the mold. If the dryer has ample heat capacity to permit rapid heating and hardening, the articles will harden sufficiently prior to loss of an excessive amount of moisture. For less rapid drying, it is preferable to prevent an excessive loss of the moisture which should be present during the hardening step by surrounding the articles with an atmosphere of steam until the hardening is substantially completed. Thereafter the articles may be dried and after the drying has been completed they may be trimmed, if desired, to improve the surface or to remove roughness.

For preferred results in the practice of this invention, simultaneous precipitation of normal magnesium carbonate and calcium carbonate from magnesium bicarbonate solution by addition of lime thereto should be controlled so as to produce normal magnesium carbonate and calcium carbonate in a form that is suitable for use in the manufacture of heat insulation materials. For this reason, the particles of lime which enter into the reaction are preferably reduced to as fine a state of subdivision as possible prior to reaction thereof with the magnesium bicarbonate solution. To this end, it is preferable, as mentioned in the example given above, to slake the lime that is used prior to reacting the lime with the magnesium bicarbonate solution, inasmuch as the lime in the process of slaking is caused to occur in a state of very fine subdivision. If unslaked lime is used, it is preferable to pulverize the lime prior to introducing it into the magnesium bicarbonate solution. During the reaction of the lime with the magnesium bicarbonate solution, the mass should be kept in a state of agitation, although one should avoid agitation that is sufficiently violent to cause decomposition of a large proportion of the bicarbonate solution due to loss of carbon dioxide. The speed of the reaction between the magnesium bicarbonate solution and the particles of lime may be increased by causing the reaction to occur at elevated temperature, although the temperature at which the reaction is caused to occur should be kept below about 158° F., and is preferably kept below about 140° F.

The physical state of the particles of normal magnesium carbonate which are formed as a product of the reaction between the lime and the magnesium bicarbonate solution and which naturally occur in the form of needle-shaped crystals can be improved for use according to this invention by mechanically disintegrating the naturally-occurring normal magnesium carbonate crystals as described in our application Serial No. 283,738, filed July 11, 1939, for Formed article and magnesium carbonate therefor and the manufacture thereof.

This invention is not to be restricted to a source of the magnesium bicarbonate solution that is used, it being obvious that any such solution, however produced or of any degree of purity, may be used. For example, magnesium bicarbonate solution may be produced by gassing hydrated magnesite with carbon dioxide to convert the magnesite to a solution of magnesium bicarbonate.

In our application Serial No. 225,140, filed August 16, 1938, for Manufacture of normal magnesium carbonate and heat insulation material containing same, we have described a process whereby a magnesium bicarbonate solution of about 2.7 to 3% of magnesium bicarbonate is heated under controlled temperature conditions as to precipitate a portion, usually a major proportion, of the magnesia as normal magnesium carbonate, leaving the remainder of the magnesia in solution as magnesium bicarbonate. This magnesium bicarbonate solution, either separated from the precipitated normal magnesium carbonate or combined with the precipitated normal magnesium carbonate, may be used according to this invention by causing the magnesium bicarbonate to react with calcium-containing lime to precipitate the remainder of the magnesia as normal magnesium carbonate and so as to precipitate calcium carbonate. If the normal magnesium carbonate precipitated by heat is left suspended in the magnesium bicarbonate solution and a substantial amount of calcium carbonate is desired, ordinary calcium lime, either in the form of finely-divided oxide or slaked lime may be added so as to introduce a maximum amount of calcium carbonate into the mixture. If dolomitic lime which contains both calcium and magnesium is used instead of ordinary calcium lime, then it may be desirable to supplement the resulting mixture of normal magnesium carbonate and calcium carbonate with additional calcium carbonate. For this purpose, some of the whiting which is ordinarily a waste product in carrying out the Pattinson process may be used. Any of the mixtures of precipitated normal magnesium carbonate and calcium carbonate thus produced can, of course, be incorporated into a slurry and molded and heated as described hereinabove.

When a substantially pure solution of magnesium bicarbonate is caused to completely react with dolomitic lime in the proportion derived from naturally-occurring dolomitic rock, the molecular ratio of normal magnesium carbonate to calcium carbonate in the precipitated product is about three to one. The composition thus produced and containing normal magnesium carbonate and calcium carbonate in the ratio of about three to one is especially desirable for producing a heat insulation which is light and which at the same time is mechanically strong. Moreover, when added heat resistance is desired, an inert filler can be added such as exfoliated mica or diatomaceous earth (raw or calcined) and a high degree of strength can be preserved provided the ratio of normal magnesium carbonate to calcium carbonate is about three to one. While the ratio can be somewhat lower, it is preferable that the ratio of normal magnesium carbonate to calcium carbonate not be less than about two to one, either when the solids consist substantially of magnesium carbonate, calcium carbonate and mineral fiber or when added mineral fillers are present.

While the foregoing represents preferred practice of this invention, some of the advantages thereof can be attained even when the ratio of normal magnesium carbonate to calcium carbonate is less than two to one. Thus it is possible in the practice of this invention to add precipitated calcium carbonate such as the precipitate of calcium carbonate which is usually considered as a waste product in carrying out the Pattinson process, to the product produced by reacting magnesium bicarbonate solution with dolomitic lime until the ratio of normal magnesium carbonate to calcium carbonate is less than two to one. It has been found, for example, that a product suitable for many purposes can be made when normal magnesium carbonate crystals are in admixture in about equal proportion with precipitated calcium carbonate. It is normally undesirable, however, to increase the proportion of precipitated calcium carbonate to greater than two parts of the precipitated calcium carbonate to one part of normal magnesium carbonate. When the proportion of calcium carbonate is increased relatively to normal magnesium carbonate, the heat insulation that is produced from the combined materials will be heavier and its thermal insulating efficiency will be somewhat less.

It is apparent that the process of this invention is particularly suitable for making heat insulation from dolomite. A magnesium bicarbonate solution can be prepared from the dolomite rock by the Pattinson process and separated from the calcium carbonate. Thereafter the magnesium bicarbonate is treated with dolomitic lime to produce a mixture of calcium carbonate and normal magnesium carbonate. To this mixture the whiting which was separated in producing the pure magnesium bicarbonate solution may be returned subject to the limitations above mentioned. Moreover, in carrying out the process, all of the magnesia in the dolomite is caused to occur in the form of normal magnesium carbonate so that molded insulations can be initially made up containing the magnesia in the form of normal magnesium carbonate prior to conversion of the normal magnesium carbonate in situ in the molded article by application of heat so as to achieve the high bonding properties and freedom of shrinkage which has been mentioned above. If desired, the calcium carbonate that is separated from the magnesium bicarbonate solution may be suspended in water and screened or settled, or both, or otherwise treated to remove undesirably heavy particles prior to return of the calcium carbonate to the process.

A further example of the practice of this invention may be given illustrating the combination of finely-divided filler material other than calcium carbonate with normal magnesium carbonate in the manufacture of a heat insulation material. Magnesium bicarbonate solution from any source and separated from solid matter is treated with dolomitic lime at a temperature below 158° F. and preferably with agitation. The resulting product is an aqueous admixture of normal magnesium carbonate and precipitated calcium carbonate in the ratio of about three to one. The admixture is then mixed with a porous mineral filler, e. g., diatomaceous earth, either during the reaction, or after, or after excess water is drained away prior to molding. The mixture is molded with or without pressure and is heated to above about 160° F. to convert the normal magnesium carbonate to basic magnesium carbonate. More specifically, according to this example, 1000 gallons of a 3% solution of magnesium bicarbonate solution and containing about 250 lbs. of magnesium bicarbonate is reacted with 75 lbs. of dolomitic lime. Prior to molding, about 75 lbs. of diatomaceous earth and 40 lbs. of asbestos fiber are incorporated. The admixture is concentrated prior to molding until the solids therein are about 2.7 lbs. per gallon of aqueous paste. After molding (with or without pressure), the molded article is heated to about 185° F. without substantial loss of water until the mixture is hardened. The hardened article is dried at about 175 to 300° F. In the resulting product, the normal magnesium carbonate is integrally bonded to form a rigid insulation and bonds the other ingredients, namely, the calcium carbonate, diatomaceous earth, and asbestos fiber. The product has high heat insulation efficiency and is very resistant to heat. It is also very light in weight. The product is superior in heat insulating efficiency, heat resistance and lightness to one wherein the finely-divided filler consists entirely of calcium carbonate; and a product that is superior in these qualities as well as in strength is obtained as compared with one wherein basic magnesium carbonate and calcium carbonate occur, for example, in substantially equal proportions.

According to another method of practising this invention, all of the dolomitic rock may be utilized in the following manner. The dolomitic rock is calcined and then hydrated to form hydrated dolomitic lime. Alternatively, finely-divided calcined dolomitic lime is suspended in water. In either event, the lime in suspension is treated with carbon dioxide gas until the magnesia in the lime is substantially all dissolved as magnesium bi-carbonate and until the calcium is precipitated as calcium carbonate. The slurry is then not filtered as in the Pattinson process described hereinabove but is mixed directly with hydrated dolomitic lime or finely-divided calcined dolomitic lime as disclosed hereinabove in connection with the treatment of filtered magnesium bicarbonate solution with dolomitic lime. Notwithstanding the fact that the calcium carbonate is not removed from the magnesium bicarbonate solution, the magnesium bicarbonate solution will react with the added dolomitic lime to convert the magnesium bicarbonate to normal magnesium carbonate so as to precipitate normal calcium carbonate. The mixture thus produced is similar in composition and characteristics to a composition prepared by adding dolomitic lime to filtered magnesium bicarbonate solution to form a mixture of normal magnesium carbonate and calcium carbonate in the ratio of about three to one and thereafter adding to the mixture the calcium carbonate separated during the filtration of the magnesium bicarbonate solution. However, by following this procedure one is not able to remove coarse particles and solid impurities from the calcium carbonate as is possible when the calcium carbonate is separated and is treated to remove these coarse particles and impurities. Moreover, this process results in a high percentage of calcium carbonate, but, if desired, part of the calcium carbonate can be removed from the bicarbonate solution prior to the reaction thereof with lime to decrease the amount of calcium carbonate in the final product.

In carrying out the reaction between the magnesium bicarbonate solution and the lime as illustrated hereinabove, the amount of lime that is added is preferably sufficient but not greatly in excess of that required to react with all the magnesium bicarbonate, as any bicarbonate left in solution would be lost upon concentrating or thickening the suspension prior to or during molding. Moreover, complete neutralization of the bicarbonate serves to prevent the formation of undesirably large crystals of normal magnesium carbonate. A slight excess of the lime that is not converted to carbonate in the initial reaction is desirable, inasmuch as when the lime is carried into the molds and the molded material is heated to convert the normal magnesium carbonate to basic magnesium carbonate with liberation of carbon dioxide, the lime will react with the liberated carbon dioxide to form a stable carbonate and will prevent the formation of blow holes in the molded product. In lieu of the presence of lime to react with the liberated carbon dioxide in the manner described, some other alkali may be used such as magnesium oxide.

The product of this invention is as aforesaid light and strong. To this end, the aqueous composition for molding heat insulation preferably contains as solids about 75 per cent. to 50 per cent. of normal magnesium carbonate, about 15 per cent. to 30 per cent. of calcium carbonate, and about 8 to 15 per cent. of mineral fiber, and the ratio of normal carbonate to calcium carbonate is greater than two to one and preferably is approximately three to one. The magnesium and calcium carbonate should constitute a major proportion of the composition.

In the completed insulation, the normal magnesium carbonate in the moldable aqueous composition has been converted to basic magnesium carbonate which, by formation in situ in the molded article, becomes bonded together and bonds the entire mass into a light and porous but strong heat insulation material. Preferably, as aforesaid, the carbonates are in major proportion and the ratio of basic magnesium carbonate to calcium carbonate in the finished product is greater than two to one and is preferably approximately three to one. The carbonates may, for example, occur in the insulation in about the preferred proportions mentioned above. The fiber constitutes about 8 to 15 per cent of the insulation. Other finely-divided filler materials may be used, such as the porous mineral fillers above mentioned, to the extent of about 10 to 35 per cent. The resulting product possesses the following properties which make it a new and valuable improvement in the art. The heat resistance will be greater than mixtures containing no filler other than calcium carbonate and for a given density, the product may be considerably stronger than prior art compositions. Also, the density may be kept lower. In addition, mixtures of the type, that is containing diatomaceous earth, calcium carbonate, fiber, and basic magnesium carbonate derived from normal magnesium carbonate by heating in situ are stronger and lighter than similar mixtures containing basic carbonate of magnesia made in the usual manner.

It is to be understood that the illustrations of this invention given hereinabove are for purposes of exemplifying this invention and that the scope of this invention is defined by the following claims.

We claim:

1. In a method of making formed heat insulation material comprising basic magnesium carbonate and calcium carbonate, the steps comprising preparing a solution of magnesium bicarbonate, adding thereto a calcium containing lime to form a mixture of calcium carbonate and normal magnesium carbonate, forming an article from an aqueous slurry comprising said calcium carbonate and normal magnesium carbonate, and heating the formed article while moist to convert the normal magnesium carbonate into basic magnesium carbonate.

2. In a method of making formed heat insulation material comprising basic magnesium carbonate and calcium carbonate, the steps comprising making a solution consisting essentially of dissolved magnesium bicarbonate, adding thereto dolomitic lime to form a mixture of calcium carbonate and normal magnesium carbonate, forming an article from an aqueous slurry comprising said calcium carbonate and said normal magnesium carbonate together with mineral fiber, and heating the formed article to convert the normal magnesium carbonate into basic magnesium carbonate.

3. In a method of making a formed heat insulation material comprising basic magnesium carbonate and calcium carbonate, the steps comprising preparing a solution of magnesium bicarbonate in admixture with precipitated calcium carbonate, separating precipitated calcium carbonate from the magnesium bicarbonate solution, then adding to the magnesium bicarbonate solution both calcium lime and magnesium lime to form an aqueous mixture of normal magnesium carbonate and calcium carbonate, forming an article from an aqueous mixture containing said normal magnesium carbonate and said calcium carbonate, and heating the formed article while moist to above about 160° F., to convert the normal magnesium carbonate to basic magnesium carbonate, mineral fiber being included in the aqueous mixture prior to the forming step.

4. In a method according to claim 3, the further step of adding precipitated calcium carbonate to the aqueous mixture of normal magnesium carbonate and calcium carbonate prior to the forming step.

5. In a method of making a formed heat insulation material comprising basic magnesium carbonate and calcium carbonate, the steps comprising treating dolomitic lime with carbon dioxide to form insoluble calcium carbonate and magnesium bicarbonate in solution, separating the insoluble calcium carbonate from the magnesium bicarbonate solution, adding dolomitic lime to the magnesium bicarbonate solution to produce a mixture of calcium carbonate and normal magnesium carbonate, forming an article from an aqueous slurry containing said calcium carbonate and said normal magnesium carbonate together with mineral fiber, and heating the formed article while moist to convert the normal magnesium carbonate to basic magnesium carbonate.

6. In a method according to claim 5, the further step of treating the calcium carbonate separated from the magnesium bicarbonate solution to separate out coarse particles and thereafter incorporating said calcium carbonate in said aqueous slurry prior to the forming step.

7. In a method of making a formed heat insulation material comprising basic magnesium carbonate and calcium carbonate, the steps comprising preparing a solution of magnesium bicarbonate, adding both calcium lime and magnesium lime to said solution to form a mixture of normal magnesium carbonate and calcium carbonate, the molecular ratio of normal magnesium carbonate to calcium carbonate in the mixture being greater than 2 to 1, incorporating a finely-divided porous mineral filler and mineral fiber with the admixed normal magnesium carbonate and calcium carbonate, forming an article from a slurry containing the aforesaid solid ingredients, and heating the molded article while moist to convert the normal magnesium carbonate therein to basic magnesium carbonate.

8. In a method of making formed heat insulation comprising basic magnesium carbonate and calcium carbonate, the steps comprising treating a suspension containing both calcium lime and magnesium lime with carbon dioxide to form a solution of magnesium bicarbonate and precipitated calcium carbonate, then adding additional calcium lime and magnesium lime to the solution of magnesium bicarbonate containing precipitated calcium carbonate to form an admixture of normal magnesium carbonate and additional calcium carbonate, molding the mixture containing normal magnesium carbonate and calcium carbonate, and heating the molded mixture while moist to a temperature above about 160° F., to convert the normal magnesium carbonate to basic magnesium carbonate.

9. In a method of making formed heat insulation material comprising basic magnesium carbonate and calcium carbonate, the steps comprising preparing a solution of magnesium bicarbonate, adding thereto a calcium containing lime to form a mixture of calcium carbonate and normal magnesium carbonate, forming an article from an aqueous slurry comprising said calcium carbonate and said normal magnesium carbonate, and heating the formed article while moist to convert the normal magnesium carbonate to basic magnesium carbonate, free alkaline material being included in the formed article prior to heating and reacting with carbon dioxide liberated during the heating step wherein normal magnesium carbonate is converted to basic magnesium carbonate to form with the liberated carbon dioxide a carbonate.

10. A process according to claim 9 wherein the free alkaline material is lime.

11. In a method of making formed heat insulation material comprising basic magnesium carbonate and calcium carbonate, the steps of preparing a solution of magnesium bicarbonate, heating the solution of magnesium bicarbonate to precipitate normal magnesium carbonate leaving some of the magnesium bicarbonate remaining in solution, and then reacting the magnesium bicarbonate remaining in solution with calcium containing lime to precipitate calcium carbonate and convert the magnesium bicarbonate to normal magnesium carbonate, forming an article from an aqueous slurry containing said normal magnesium carbonate and said calcium carbonate, and heating the formed article while moist to convert the normal magnesium carbonate into basic magnesium carbonate.

12. A composition for use in the manufacture of heat insulation materials which comprises in aqueous admixture calcium carbonate, finely-divided normal magnesium carbonate, mineral fiber, and an alkaline material adapted to react with carbon dioxide.

13. A composition according to claim 12 wherein said alkaline material comprises lime.

14. A composition for use in the manufacture of heat insulation material which comprises in aqueous admixture precipitated calcium carbonate, finely-divided normal magnesium carbonate, and mineral fiber, the molecular ratio of normal magnesium carbonate to calcium carbonate being greater than about 2 to 1 and said carbonates constituting a major proportion of the solids.

15. A composition according to claim 14 which comprises a minor proportion of porous mineral filler.

16. A composition for use in the manufacture of heat insulation material which comprises in aqueous admixture precipitated calcium carbonate, finely-divided normal magnesium carbonate, and mineral fiber, the molecular ratio of normal magnesium carbonate to calcium carbonate being approximately 3 to 1 and said carbonates constituting a major proportion of the solids.

17. A molded heat insulation material which comprises in major proportion a mixture of basic magnesium carbonate and calcium carbonate, the ratio of basic magnesium carbonate to calcium carbonate being greater than 2 to 1, said basic magnesium carbonate being integrally bonded together and with the other ingredients of the insulation by formation from normal magnesium carbonate by decomposition of the normal magnesium carbonate in situ in the molded insulation, and said insulation material containing at least about 8% of mineral fiber.

18. A molded heat insulation material which comprises about 50 to 75% of basic magnesium carbonate, about 15 to 30% of calcium carbonate, and about 8 to 15% of mineral fiber, the ratio of said basic magnesium carbonate to calcium carbonate being greater than about 2 to 1 and said basic magnesium carbonate being integrally bonded together and with the other ingredients of the insulation by formation from normal magnesium carbonate by decomposition of the normal magnesium carbonate in situ in the molded insulation.

ROGER A. MacARTHUR.
HAROLD W. GREIDER.